(12) United States Patent
Litzau et al.

(10) Patent No.: US 12,394,199 B2
(45) Date of Patent: Aug. 19, 2025

(54) ENHANCED FLIGHT VISION SYSTEM

(71) Applicant: Garmin International, Inc., Olathe, KS (US)

(72) Inventors: Alexander J. Litzau, Olathe, KS (US); Iain P. Gillan, Olathe, KS (US); Noah R. Larson, Overland Park, KS (US); Ryan R. Johnson, Kansas City, MO (US); Daniel J. Croft, Shawnee, KS (US); Steven A. Stringfellow, Overland Park, KS (US)

(73) Assignee: Garmin International, Inc., Olathe, KS (US)

( * ) Notice: Subject to any disclaimer, the term of this patent is extended or adjusted under 35 U.S.C. 154(b) by 610 days.

(21) Appl. No.: 17/811,208

(22) Filed: Jul. 7, 2022

(65) Prior Publication Data

US 2023/0222786 A1 Jul. 13, 2023

Related U.S. Application Data

(60) Provisional application No. 63/219,395, filed on Jul. 8, 2021.

(51) Int. Cl.
*G06V 20/17* (2022.01)
*G08G 5/76* (2025.01)

(52) U.S. Cl.
CPC .............. *G06V 20/17* (2022.01); *G08G 5/76* (2025.01)

(58) Field of Classification Search
None
See application file for complete search history.

(56) References Cited

U.S. PATENT DOCUMENTS

| | | | |
|---|---|---|---|
| 8,917,191 B1 * | 12/2014 | Tiana | G08G 5/54 701/16 |
| 10,114,381 B2 | 10/2018 | Haskins et al. | |
| 2009/0009596 A1 * | 1/2009 | Kerr | H04N 19/186 348/117 |

(Continued)

OTHER PUBLICATIONS

Printout from https://en.wikipedia.org/wiki/Enhanced_flight_vision_system published prior to Jul. 7, 2022.

(Continued)

*Primary Examiner* — Sean M Conner
(74) *Attorney, Agent, or Firm* — Samuel M. Korte; Max M. Ali

(57) ABSTRACT

An enhanced vision system comprising a camera, a memory, and a processor. The camera configured to capture video of a field of view and output a plurality of frames, each frame including a respective sensor pixel value for each of a plurality of sensor pixels. The memory configured to store the plurality of frames and a threshold sensor pixel value. The processor configured to receive the plurality of frames, identify, in each of the plurality of frames output over a first period of time, one or more sensor pixel values above a threshold sensor pixel value, enhance a current frame by changing corresponding sensor pixel values of the current frame based on each of the identified one or more sensor pixel values above the threshold sensor pixel value, and generate an enhanced video of the field of view including the enhanced current frame to be presented on a display.

18 Claims, 11 Drawing Sheets

(56) References Cited

U.S. PATENT DOCUMENTS

| | | | |
|---|---|---|---|
| 2013/0188049 A1* | 7/2013 | Koukol | G08G 5/54 |
| | | | 348/E7.085 |
| 2016/0373684 A1* | 12/2016 | Sherman | H04N 23/745 |
| 2017/0011529 A1* | 1/2017 | Urashita | G06T 5/20 |
| 2017/0032683 A1* | 2/2017 | Meserole, Jr. | G08G 5/80 |
| 2020/0110949 A1* | 4/2020 | Asvatha Narayanan | |
| | | | G08G 1/0965 |
| 2020/0184934 A1* | 6/2020 | Choi | G09G 5/18 |
| 2021/0397870 A1* | 12/2021 | Bredno | G01N 21/6486 |

OTHER PUBLICATIONS

Printout from https://www.garmin.com/en-US/blog/aviation/announcement-garmin-head-display-integrated-flight-decks/ published prior to Jul. 7, 2022.

Printout from https://www.nexga.com/cirrus-perspective/ published prior to Jul. 7, 2022.

\* cited by examiner

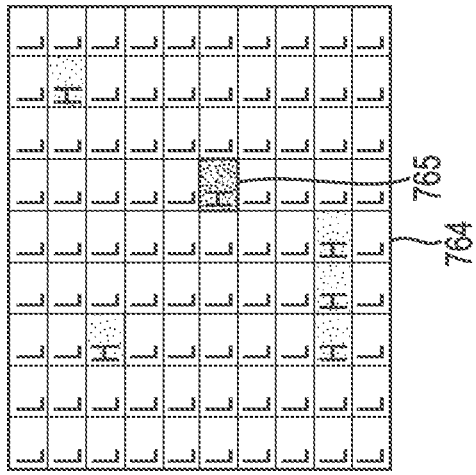
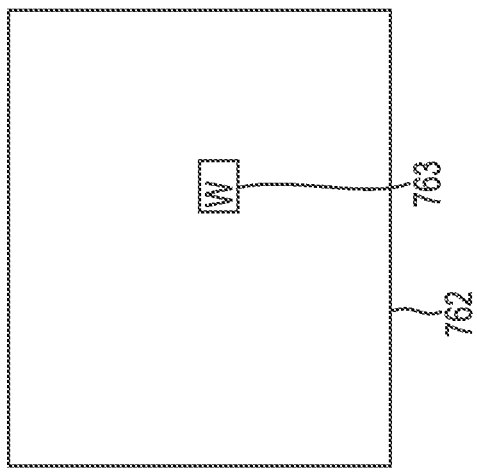
FIG. 7A
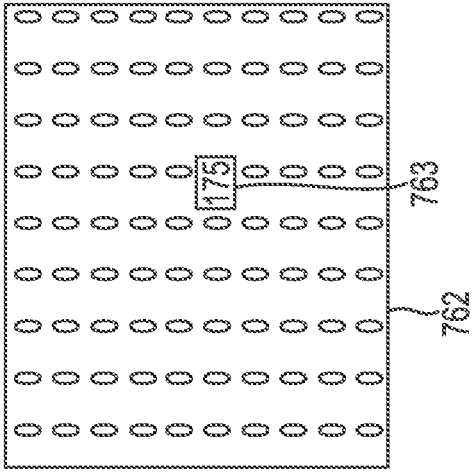
FIG. 7B
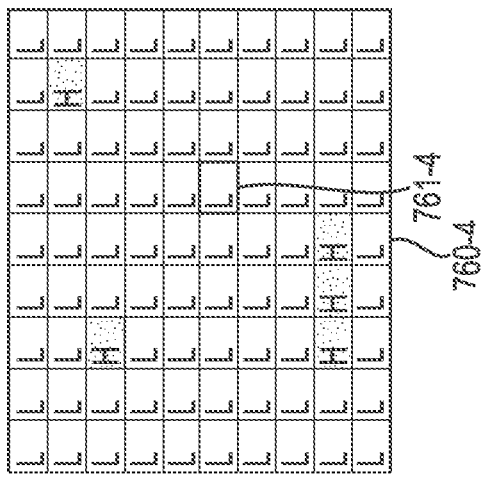

| | | |
|---|---|---|
| FRAME 1 | 0 | LOW |
| FRAME 2 | 125 | HIGH |
| FRAME 3 | 0 | LOW |
| FRAME 4 | 0 | LOW |
| FRAME 5 | 0 | LOW |
| FRAME 6 | 85 | HIGH |
| OUTPUT | 125 | |

FIG. 8A

| | | |
|---|---|---|
| FRAME 1 | 128 | LOW |
| FRAME 2 | 145 | HIGH |
| FRAME 3 | 135 | LOW |
| FRAME 4 | 127 | LOW |
| FRAME 5 | 130 | LOW |
| FRAME 6 | 140 | HIGH |
| OUTPUT | 145 | |

FIG. 8B

| | | |
|---|---|---|
| FRAME 1 | 0 | LOW |
| FRAME 2 | 0 | LOW |
| FRAME 3 | 125 | HIGH |
| FRAME 4 | 201 | HIGH |
| FRAME 5 | 0 | LOW |
| FRAME 6 | 85 | HIGH |
| OUTPUT | 201 | |

FIG. 8C

| | | |
|---|---|---|
| FRAME 1 | 128 | LOW |
| FRAME 2 | 127 | LOW |
| FRAME 3 | 140 | HIGH |
| FRAME 4 | 141 | HIGH |
| FRAME 5 | 130 | LOW |
| FRAME 6 | 126 | LOW |
| OUTPUT | 141 | |

FIG. 8D

| | | |
|---|---|---|
| FRAME 1 | 128 | LOW |
| FRAME 2 | 127 | LOW |
| FRAME 3 | 135 | HIGH |
| FRAME 4 | 135 | HIGH |
| FRAME 5 | 130 | LOW |
| FRAME 6 | 126 | LOW |
| OUTPUT | 135 | |

FIG. 8E

| | | |
|---|---|---|
| FRAME 1 | 128 | LOW |
| FRAME 2 | 137 | LOW |
| FRAME 3 | 135 | LOW |
| FRAME 4 | 127 | LOW |
| FRAME 5 | 130 | LOW |
| FRAME 6 | 120 | LOW |
| OUTPUT | 120 | |

FIG. 8F

| | | |
|---|---|---|
| FRAME 1 | 125 | HIGH |
| FRAME 2 | 0 | LOW |
| FRAME 3 | 0 | LOW |
| FRAME 4 | 201 | HIGH |
| FRAME 5 | 0 | LOW |
| FRAME 6 | 85 | HIGH |
| OUTPUT | 137 | |

FIG. 8G

| | | |
|---|---|---|
| FRAME 1 | 125 | HIGH |
| FRAME 2 | 0 | LOW |
| FRAME 3 | 0 | LOW |
| FRAME 4 | 201 | HIGH |
| FRAME 5 | 0 | LOW |
| FRAME 6 | 22 | LOW |
| OUTPUT | 163 | |

FIG. 8H

| | | |
|---|---|---|
| FRAME 1 | 0 | LOW |
| FRAME 2 | 40 | LOW |
| FRAME 3 | 175 | HIGH |
| FRAME 4 | 32 | LOW |
| FRAME 5 | 0 | LOW |
| FRAME 6 | 20 | LOW |
| OUTPUT | 175 | |

FIG. 8I

| | | |
|---|---|---|
| FRAME 1 | 0 | LOW |
| FRAME 2 | 40 | LOW |
| FRAME 3 | 175 | HIGH |
| FRAME 4 | 132 | HIGH |
| FRAME 5 | 33 | LOW |
| FRAME 6 | 20 | LOW |
| OUTPUT | 175 | |

FIG. 8J

| FRAME 1 | 0 | LOW |
|---|---|---|
| FRAME 2 | 40 | LOW |
| FRAME 3 | 176 | HIGH |
| FRAME 4 | 132 | HIGH |
| FRAME 5 | 33 | LOW |
| FRAME 6 | 20 | LOW |
| OUTPUT | 154 | |

FIG. 8K

| FRAME 1 | 40 | LOW |
|---|---|---|
| FRAME 2 | 175 | HIGH |
| FRAME 3 | 132 | HIGH |
| FRAME 4 | 163 | HIGH |
| FRAME 5 | 33 | LOW |
| FRAME 6 | 20 | LOW |
| OUTPUT | 20 | |

FIG. 8L

| FRAME 1 | 128 | LOW |
|---|---|---|
| FRAME 2 | 150 | HIGH |
| FRAME 3 | 152 | HIGH |
| FRAME 4 | 151 | HIGH |
| FRAME 5 | 126 | LOW |
| FRAME 6 | 129 | LOW |
| OUTPUT | 129 | |

FIG. 8M

| FRAME 1 | 128 | LOW |
|---|---|---|
| FRAME 2 | 129 | LOW |
| FRAME 3 | 152 | HIGH |
| FRAME 4 | 151 | HIGH |
| FRAME 5 | 152 | HIGH |
| FRAME 6 | 150 | HIGH |
| OUTPUT | 150 | |

FIG. 8N

| FRAME 1 | 128 | LOW |
|---|---|---|
| FRAME 2 | 129 | LOW |
| FRAME 3 | 126 | LOW |
| FRAME 4 | 128 | LOW |
| FRAME 5 | 125 | LOW |
| FRAME 6 | 150 | HIGH |
| OUTPUT | 150 | |
| FRAME 1 | 127 | LOW |
| FRAME 2 | 129 | LOW |
| FRAME 3 | 126 | LOW |
| FRAME 4 | 128 | LOW |
| FRAME 5 | 125 | LOW |
| FRAME 6 | 129 | LOW |
| OUTPUT | 150 | |

FIG. 8O

ENHANCED FLIGHT VISION SYSTEM

RELATED APPLICATIONS

The present application claims priority benefit under 35 U.S.C. § 119(e) of U.S. Provisional Application Ser. No. 63/219,395, filed Jul. 8, 2021, and titled "Approach Landing Lights," the contents of which are hereby incorporated by reference herein in their entirety.

TECHNICAL FIELD

The present disclosure relates generally to an enhanced vision system operable to be used with or within an aircraft.

BACKGROUND

An aircraft, such as an airplane or a helicopter, can include or may be operable with an avionics system. The avionics system can assist in navigating and landing the aircraft. The avionics system can include one or more displays a user can view during a flight to aid in navigating and/or landing the aircraft. As utilized herein, the term user may mean any operator of the aircraft. For example, a user may be an owner of the aircraft, a crew member, a pilot, a passenger, and so forth.

Conventional avionics systems having one or more cameras positioned at the front of the aircraft, below the aircraft or in the cockpit and oriented to capture footage of a field of view outside the aircraft and displays in the aircraft cockpit on which the video footage is presented may provide a pilot raw video footage without any modification of the depicted content or by performing enhancements to the entire image such that the characteristics of the imagery in all of the pixels are adjusted uniformly. For instance, adjustments to the brightness, contrast or sharpness of the content presented on the display may cause changes to be made to the content presented on all pixels of the display.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

FIGS. 7A and 7B are each examples of an enhanced vision system enhancing a frame.

FIGS. 8A-8O are examples of changing or preserving a sensor pixel value associated with a sensor pixel in a current frame based on sensor pixel values associated with the same sensor pixel in a plurality of preceding frames when enhancing the current frame.

DETAILED DESCRIPTION

Figure 1A:
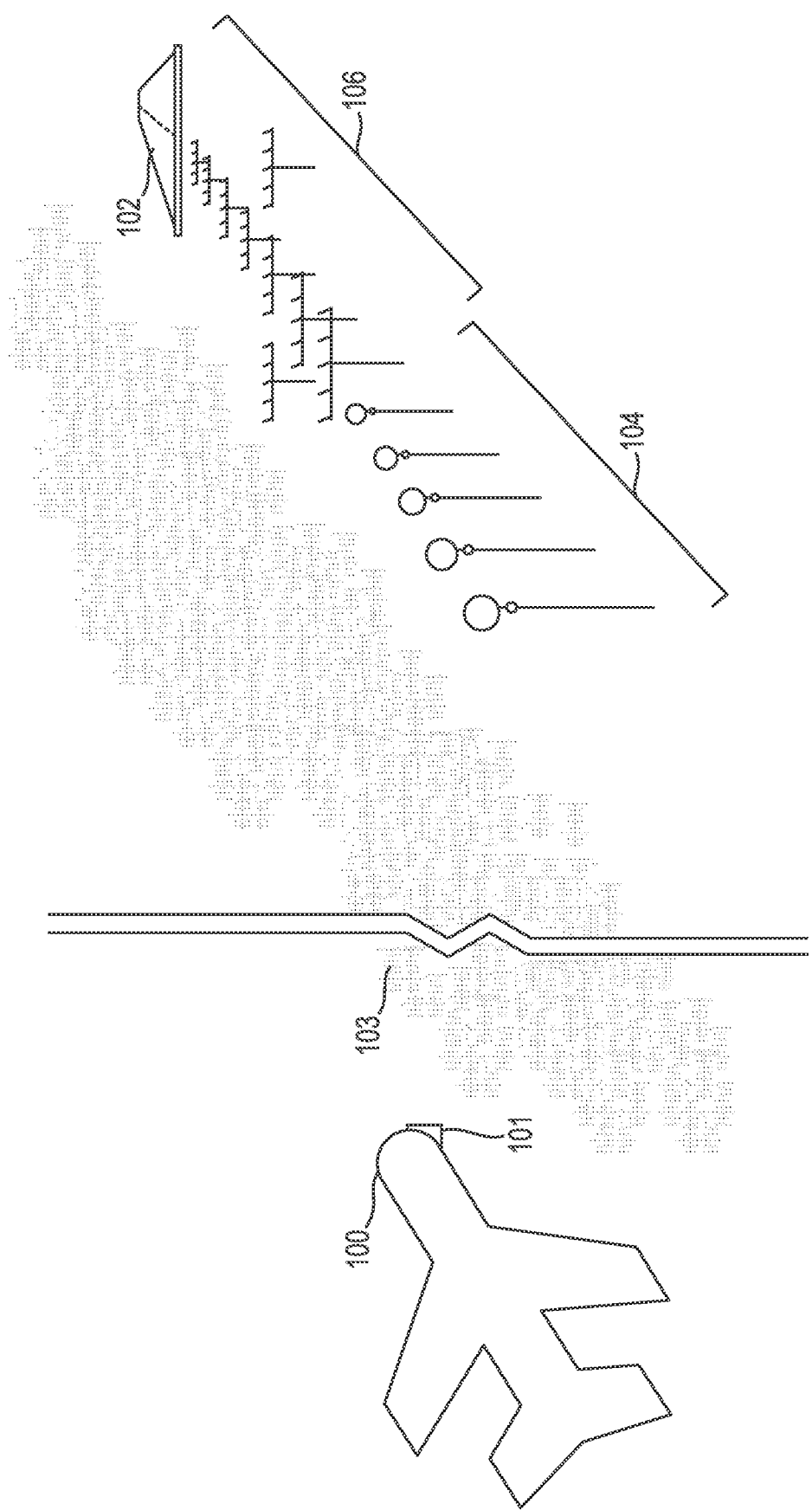
FIGS. 1A and 1B are each examples of an aircraft landing at an airport including a runway, steady burning approach lights, and flashing approach lights.

A conventional display having a refresh rate that is not matched to the frame rate of a video output device to which the display is electrically coupled will typically result in frames not being presented to the user (this phenomenon is commonly referred to as screen tearing). The result of a conventional display not presenting all of the frames that may be generated by a video output device is that fast-moving objects or flashes of light may not appear correctly, in their entirety or at all. For instance, a conventional display having a refresh rate that is lower than a frame rate of a video output device, such as a processor (e.g., a graphics processor unit (GPU), a central processing unit (CPU) generating video content, etc.), will not present all of the frames output by the video output device. The severity of the problem resulting from a difference between a conventional display's refresh rate and the frame rate of the video output device is related to the degree to which the rates are different. For example, a conventional display having a refresh rate of 60 Hz, which means the display refreshes its display content 60 times per second, will present only half of the frames output by a video output device generating images at a frame rate of 120 Hz, which means the video output device is outputting 120 frames per second (FPS). Similarly, a conventional display having a refresh rate of 60 Hz, which means the display refreshes its display content 60 times per second, will present only one-quarter of the frames output by a video output device generating images at a frame rate of 240 Hz, which means the video output device is outputting 240 frames per second (FPS). Similar concerns apply to differences between a refresh rate of a display and a frame rate of a camera that is coupled to a conventional processor that outputs video content to be presented on the display as certain frames generated by the camera (at a higher frame rate than the refresh rate of the display) are not used by the processor (i.e., certain frames generated by the camera are not sent to the display) as the conventional processor may be configured to output video content at a frame rate that matches the refresh rate of the display. The techniques disclosed herein help reduce such problems, which include fast-moving objects or flashes of light not appearing correctly, in their entirety or at all.

The present disclosure includes an enhanced flight vision system operable to be used with an aircraft. The enhanced vision system can include a camera, a memory, and a processor. The camera can include a plurality of sensor pixels and can capture video of a field of view and output a plurality of frames, each frame including a respective sensor pixel value for each of the plurality of sensor pixels. The memory can store the plurality of frames and a threshold sensor pixel value. The processor can receive, from the memory, the plurality of frames output by the camera over a first period of time, the plurality of frames including a current frame, identify, in each of the plurality of frames output over the first period of time, one or more sensor pixel values above the threshold sensor pixel value, enhance the current frame by changing corresponding sensor pixel values of the current frame based on each of the identified one or more sensor pixel values above the threshold sensor pixel value, and generate an enhanced video of the field of view including the enhanced current frame to be presented on a display, such as a head up display (HUD), the display having a plurality of display pixels corresponding to the sensor pixel values.

Airports can include approach systems to assist pilots with landing aircraft. An instrument approach procedure typically allows pilots to descend to a specified minimum altitude in preparation for landing even if they do not have sufficient visibility from the cockpit to see the runway or airport. By way of example, the specified minimum altitude for certain airports may correspond to 200 feet above the ground. A pilot may descend below the specified minimum altitude and proceed to land the aircraft only if one or more required visual references positioned on or around the runway are visible to the pilot. Typically, if none of the required visual references are visible, the landing cannot continue, and a missed approach procedure is executed. If visual references are not visible, it may be possible for pilots in certain locations to descend below the specified minimum altitude to a lower height above the ground (e.g., 100 feet above the ground) if an approach lighting system is visible. In some instances, pilots may be given the discretion to descend below the minimum specified altitude to the lower height above the ground while the pilots are able to see one or more of the required visual references, thereby allowing them to continue the landing procedure in low visibility conditions. In other words, in some situations in certain locations, the ability for a pilot to see an approach lighting system proximate to a runway at an airport may enable the pilot to continue a landing procedure when the pilot may otherwise decide to execute a missed approach in low visibility conditions. The enhanced flight vision system of the present disclosure provides various advantages to pilots. For example, pilots may be provided with an improved ability to see the approach lighting system thereby improving safety and/or increasing a likelihood of being able to continue a landing procedure, particularly in low visibility conditions.

Approach lighting systems installed on the approach end of some runways at an airport may include a series of steady (continuously) burning lights and flashing lights that extend outward away from the runway (closer to approaching aircraft). The burning lights may be light bars and the flashing lights may be strobes. Some approach lighting systems can include a combination of steady burning approach lights, which are constantly illuminated, and flashing approach lights, which are illuminated intermittently at a specified illumination period and/or duty cycle. The terms "flashing approach light" and "strobe" are used interchangeably herein.

Common aircraft approach lighting systems, such as a high intensity approach lighting system with sequenced flashing lights (ALSF-2), a medium intensity approach light system with sequenced flashers (MALSF), or a medium intensity approach light system with runway alignment indicator lights (MALSR), include flashing approach lights at a specified periodicity and/or duty cycle. In some aircraft approach lighting systems, the flashing approach lights can have a periodicity of 2 Hz and a flash pulse duration (illumination period or duty cycle) between 250 microseconds and 5.5 milliseconds.

The instantaneous brightness (intensity) of the flashing approach lights may be considerably higher than the steady burning approach lights. In some cases, the human eye may perceive the brightness of the flashing approach lights to be closer to the perceived brightness of the steady burning approach lights due to a variety of factors, including a visual time constant of the human eye believed to be around 200 milliseconds, which may result in flashing approach lights to be difficult for some pilots to distinguish from steading burning approach lights in certain situations.

The processor may configure the camera to improve the accuracy of lights and moving objects and enhance the video footage maximize the pilot's ability to see the video content in all lighting and weather conditions, such as fog, rain and snow. For example, in some embodiments, the processor may configure the camera to utilize an exposure time and/or an aperture setting to substantially coincide with (e.g., match) a flash pulse duration (e.g., on time) of a flashing approach light to increase a signal to noise ratio and thereby improve the accuracy of distinguishing between flashing approach lights and lights originating from other sources, such as steady burning approach lights and light emitted by objects in the field of view, In embodiments, the processor may enhance the video footage output to the display by enhancing the lights originating from flashing approach lights, other aircraft (blinking or constant output lights on the exterior of the aircraft) between a current geolocation of the aircraft and a landing location for aircraft, or emergency and airport vehicles at an airport proximate to a runway.

Once a series of high frame rate images are generated by the camera, the processor may be configured to analyze each of the images and generate video footage that enhances or adds a flashing approach light that may not be present in the most recent frame of the raw footage. For instance, the processor may store a plurality of frames, such as ten of the most recent frames, in memory and compare the content of each of the frames to identify locations within each of the frames that may be associated with a flashing light. As the camera and the processor are located within a moving aircraft that is approaching a runway, the processor can account for the speed and movement of the aircraft by carrying out the comparison and enhancement rapidly such that the objects located in the field of view have minimal movement in the recent frames that are stored and analyzed by the processor.

In embodiments, the processor may analyze each of a plurality of sensor pixels in each of the plurality of frames output over a first period of time, such as a period of time over which the camera may output ten frames (including a current or most recently generated frame stored in the memory), to identify a sensor pixel value associated with each of the plurality of sensor pixels above a threshold sensor pixel value stored in the memory. The processor may then enhance a current frame by changing each of the identified one of more sensor pixel values above the threshold sensor pixel value based on the sensor pixel values of each of the respective sensor pixel values in the plurality of frames output by the camera over the first period of time. The processor may modify sensor pixel values above the threshold sensor pixel value to achieve an enhancement making the associated pixels on the display device easier for the pilot to perceive objects and light emitted in the field of view. The processor may utilize a variety of techniques to modify the sensor pixel values stored in the memory. For examples, the processor may change sensor pixel values above the threshold sensor pixel value in a frame containing a two-dimensional array of data. Similarly, in some examples, the processor may generate a two-dimensional mask to change the sensor pixel values above the threshold sensor pixel value in the most recent frame. The techniques disclosed herein enable a processor to identify the location(s) of light sources, such as flashing approach lights, that were recently emitting light but may not be present in the most recent frame generated by the high frame rate camera. The processor may add any flashing approach lights that are absent from the current frame by combining, merging or overlaying the mask with the current (most recent) frame to generate an enhanced image of the environment surrounding and including the airport runway with both flashing approach lights and steady burning approach lights.

In embodiments, the processor can reduce problems such as flashes of light or moving objects not appearing correctly, in their entirety or at all when the frame rate of a camera that is coupled to the processor is generating and outputting frames is higher than a refresh rate of a display that is also coupled to the processor (and typically presenting content at refresh rate matched to the frame rate of video output by the processor). In embodiments, the processor may determine that the camera is outputting imagery at a first frame rate, such as 240 frames per second, and that the display is presents video by refreshing display content at a second rate, such as 60 Hz or 120 Hz, associated with the display. The processor may perform the enhancement functionality at the second frame rate to generate video footage that is presented on the display at a refresh rate equal to the second frame rate. As a result, such video footage may be perceived by each of the pilots' eyes as natural when there is limited ambient light and/or visibility, such as fog, when the field of view contains flashes of light from the flashing approach lights near the runway. In this way, the processor can generate video footage including lights around the runway in a manner that is familiar to the human eye. Additionally, the frame enhancement techniques described herein may enable a pilot to perceive flashing and steady burning approach lights at distances that are significantly greater than typical using the human eye.

Figure 1B:
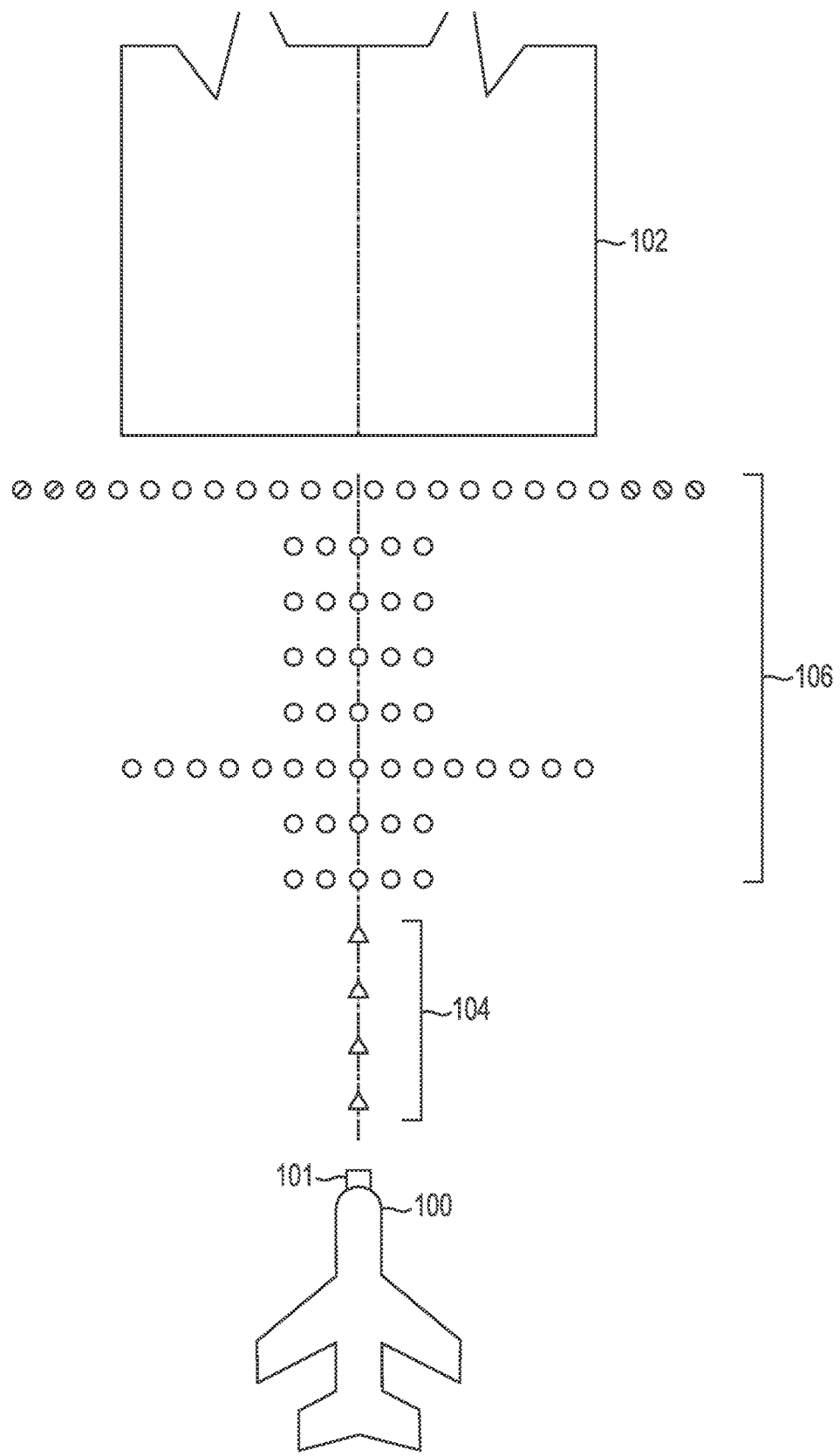

FIGS. 1A and 1B are each examples of an aircraft 100 landing at an airport including a runway 102, steady burning approach lights 106, and flashing approach lights 104. The discontinuity in FIG. 1A indicates that the airplane 100, which is approaching the runway 102 at speed, may be any distance from the flashing approach lights 104. The discontinuity in FIG. 1B indicates that the runway 102 extends beyond the end of the sheet. The steady burning approach lights 106 and the flashing approach lights 104 can be included in an aircraft approach lighting system at the airport. At certain airports, an intensity of light emitted by the flashing approach lights 104 may be thirty-five times greater than an intensity of light emitted by the steady burning approach lights 106. Both the steady burning approach lights 106 and the flashing approach lights 104 can be at high intensities, accordingly the sensor pixels of the camera 101 that receive either light may become saturated at certain distances on approach when landing the aircraft 100 or in clear weather conditions. The intensity of the light emitted by the flashing approach lights 104 and the flashing approach lights 104 can be reduced as the light passes through weather conditions 103 present near the runway 102, such as clouds, fog, rain, or snow, as illustrated in FIG. 1A.

The aircraft 100 can include a camera 101. The camera 101 can include, for example, a CMOS sensor. The camera 101 can be mounted on or integrated within the outer surface of the aircraft 100. Accordingly, the camera 101 can be mounted or positioned with an orientation to enable the camera 101 to capture video footage of a field of view and output frames of imagery while the aircraft is traveling at high speeds and possibly subject to varying levels of turbulence, which can make the accurate presentation of such steady burning approach lights 106, the flashing approach lights 104 or moving objects, difficult while the distance between the aircraft 100 and the runway 102 is large as such objects may be quite small on the display. The camera 101 can be supplemented by other cameras and technologies, such as NIR, SWIR, MWIR, LWIR and MMW utilizing image fusion to generate a comprehensive enhanced image.

The camera 101 can include a plurality of sensor pixels, which may be individual elements of a CMOS sensor. Each frame generated and output by the camera 101 can include a respective sensor pixel value corresponding to each of the plurality of sensor pixels. In embodiments, each sensor pixel of the camera 101 can have a sensor pixel value between "0" and "255," where "0" corresponds to no light received by that sensor pixel and "255" corresponds to light saturating (completely filling) the sensor pixel, if the camera 101 is configured to output sensor pixel values using an 8-bit value implementing an analog-to-digital unit (ADU) conversion technique. Each sensor pixel value of a frame output by the camera 101 is stored in memory and is analyzed and/or enhanced by the processor in real time before a current frame is output by the processor to the display for presentation to the pilots. Each sensor pixel value may substantially correspond to a display pixel of the display.

In some environments, a portion of the field of view of an aircraft 100 approaching a runway 102 can include one or more strobes of the plurality of flashing approach lights 104 of the aircraft approach lighting system proximate to a landing location for aircraft. Although enhancement of a current frame to aid pilots visually perceive a flashing approach light 104 near the runway 102 is described, the enhanced vision system can be used to enhance any light-emitting or moving object in clear weather conditions or in weather conditions that reduce visibility.

Figure 2A:
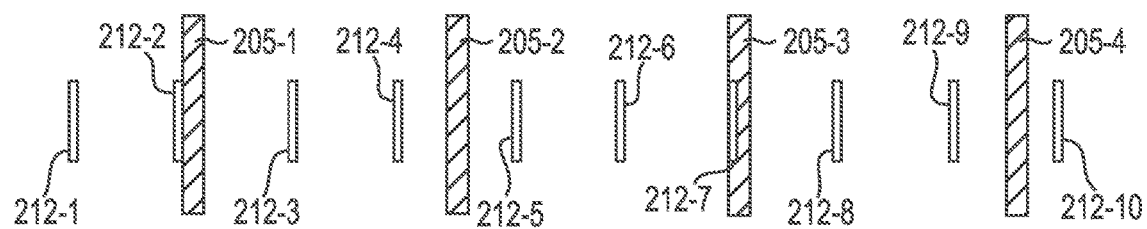
FIG. 2A is an example of a conventional camera generating frames at a rate that do not correspond to a plurality of light emissions from a flashing approach light and FIGS. 2B-2D are examples of an enhanced vision system configured to generate frames at rates that enable capture of a plurality of light emissions from a flashing approach light over a period of time.

FIG. 2A is an example of a conventional camera generating a plurality of frames 212-1 through 212-10, which may also be referred to as frames 212, at a frame rate that is commonly used by conventional camera systems and exemplary light flashes (or pulses) light flashes 205-1, 205-2, 205-3, and 205-4, which may also be referred to as flashes 205, where each flash 205 starts when light is emitted by a flashing approach light and ends when the flashing approach light stops emitting light. As seen in FIG. 2A, the four light flashes 205-1, 205-2, 205-3, and 205-4 occur over a period of time and only one of the exemplary frames 212-7 was generated by the conventional camera at a time when the third light flash 205-3 occurs. Consequently, conventional video footage generated using frames 212 would not include light flashes 205-1, 205-2 or 205-4 as none of the frames 212 were generated at the times when light flashes 205-1, 205-2 or 205-4 occurred. Additionally, a conventional camera that is not configured to generate frames of imagery at certain frame rates and exposure durations may not capture one or more flashes 205 of light emitted by a flashing approach light 104 as a display that would present the frames (raw footage) output by the conventional camera would not show any flashes of light that did not occur at a time that coincided with the generation of the frames by the conventional camera.

Figure 2B:
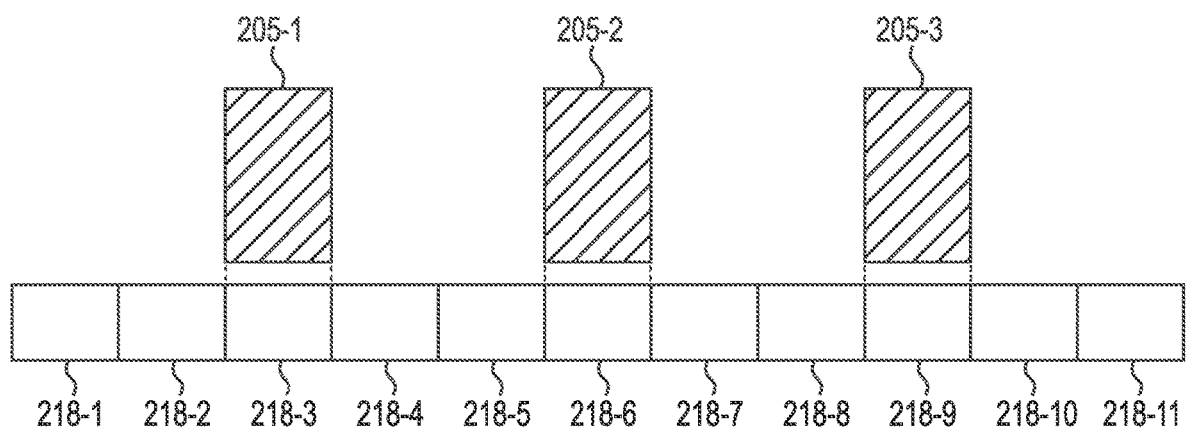
Figure 2C:
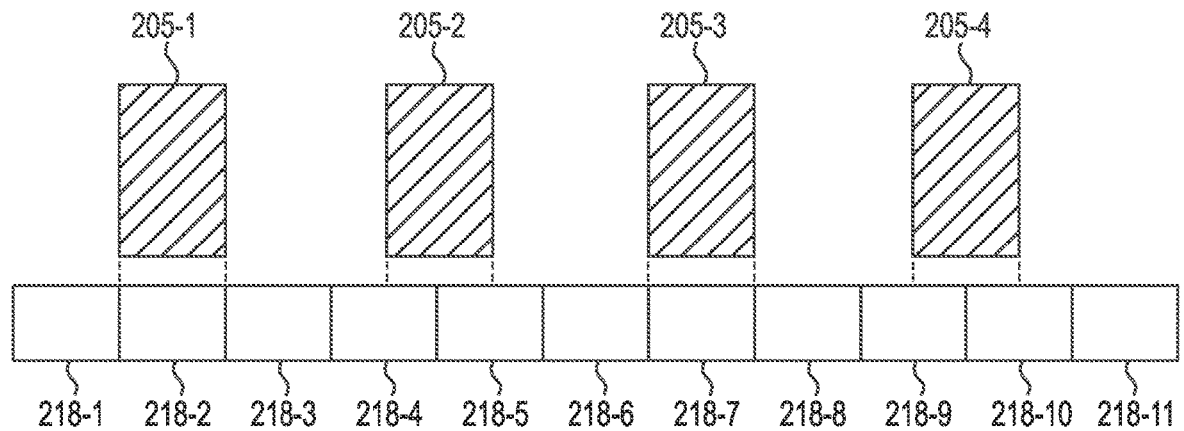
Figure 2D:
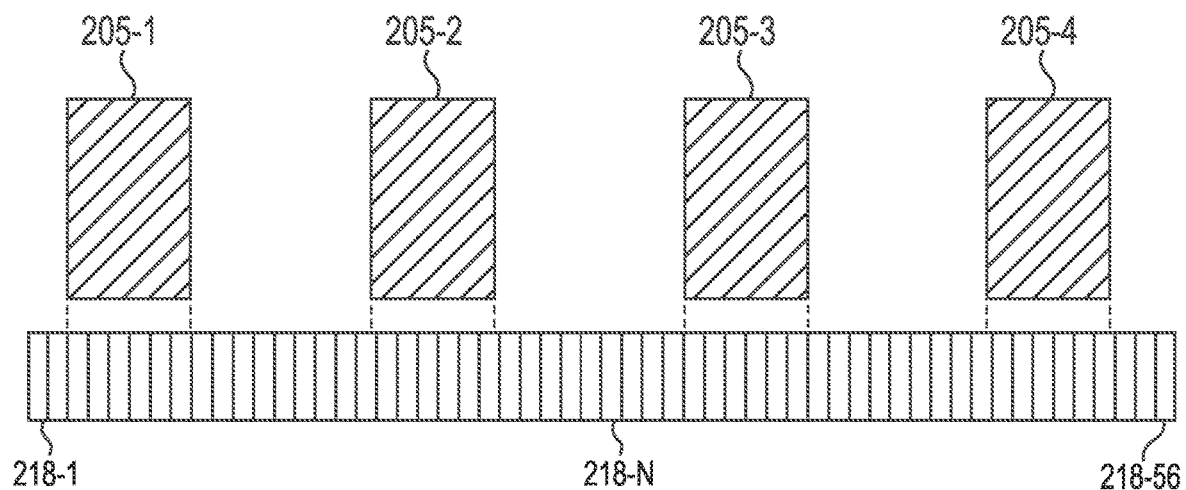

FIGS. 2B-2D are examples of embodiments in which a camera, similar to camera 101, is configured to generate frames of imagery to receive light emitted by a flashing approach light 104. As the flashing approach lights of aircraft approach lighting systems may have a duration between 250 microseconds and 5.5 milliseconds, the processor may be configured to control the camera 101 to generate frames at a rate of 4,000 frames per second (to capture emissions of light each having a duration of 250 microseconds), at a rate of 180 frames per second (to capture emissions of light each having a duration of 5.5 milliseconds) or at any frame rate between 180 frames per second and 4,000 frames per second. It is to be understood that slower frame rates may be used, however, this may result in decreased contrast of the flashers relative to other objects in the field of view. In embodiments, the processor may be configured to determine the duration of each emission of light from a flashing approach light, determine a rate at which the camera 101 may generate frames to capture emissions of light from the flashing approach light and configure the camera 101 to utilize the determined frame rate. A duration of individual light flashes (or pulses), where each flash starts when light is emitted by a flashing approach light 104 and ends when the flashing approach light 104 stops emitting light, is indicated by the width of light emissions 205-1, 205-2, 205-3, and 205-4. As one or more flashes 205 can be captured or missed by a conventional camera having a frame rate and an exposure duration that does not account for the limited duration and periodicity of the flashes 205 emitted from flashing approach light 104, the processor may configure the camera 101 to utilize stored or determined frame rate and exposure duration at least when flashes 205 may be present in the field of view of the camera 101.

In embodiments, the processor may configure the camera 101 to utilize an exposure duration that is substantially equal to the frame period, which may help ensure that the entirety of the energy from a flash pulse duration is received. In such embodiments, the camera 101 has a 100% duty cycle where it is always collecting photons from the field of view. In other words, the camera 101 would not have an off duration that is common for conventional cameras (as shown in FIG. 2A).

In embodiments, the processor will be electrically coupled with the camera 101 and control the camera 101 to adjust the lens aperture and/or partially transmissive filters to balance sensor exposure levels. The camera 101 may include partially transmissive filters that may be controlled by the processor to change the camera properties mechanically or electrically. This functionality may limit diffraction effects associated with high F #lens apertures, thus allowing the camera 101 to operate in bright day conditions without degrading resolution.

FIGS. 2B and 2C show a frame period and exposure duration that is substantially equal to the pulse duration of the flashes 205. The frame period of frames 218-1, 218-2, 218-3, 218-4, 218-5, 218-6, 218-7, 218-8, 218-9, 218-10 and 218-11 is substantially equal the to the pulse duration of the flashes 205. For example, in FIG. 2B, the camera 101 is configured to generate frames 218-3, 218-6 and 218-9 at times substantially in sync with flashes 205-1, 205-2 and 205-3, respectively. Similarly, in FIG. 2C, the camera 101 is configured to generate frames 218-2 and 218-7 at times substantially in sync with flashes 205-1 and 205-3, respectively. In this example, the flashes 205 are output at an emission rate that is different than (out of sync with) the rate which the frames 218 are generated. As a result, flashes 205-2 and 205-4 each occur at a time corresponding to multiple frames 218. Specifically, flash 205-2 occurs at a time coinciding with frames 218-4 and 218-5, respectively, and flash 205-4 occurs at a time coinciding with frames 218-9 and 218-10, respectively. In other words, at least a first portion of the flash 205-2 is captured in the frame 218-4 and at least a second portion of the flash 205-2 is captured in the frame 218-5. Similarly, at least a first portion of the flash 205-4 is captured in the frame 218-9 and at least a second portion of the flash 205-4 is captured in the frame 218-10. Accordingly, the processor can generate video footage including all of the flashes 205-1 through 205-4. Accordingly, the camera 101 can capture the flashes 205 when the frames 218 are either in sync with the flashes 205 or out of sync with the flashes 205.

In embodiments, the processor may configure the camera 101 to utilize a shorter frame period to enable two or more frames to be generated over the duration of a single pulse duration of the flashes 205. For example, as shown in FIG. 2D, the processor may configure the camera 101 generate six frames within the pulse duration of the flashes 205. It is to be understood that, although FIG. 2D depicts fifty-six frames (identified as 218-1 through 218-56, with intermediate frames identified generally as 218-N) with twenty-four frames associated with flashes 205, the processor may configure camera 101 to generate any number of frames per second. As a result, the camera 101 may generate enhanced video footage to a display including frames that include more content, including flashes 205, than conventional camera systems.

The camera 101 may utilize an exposure time that is substantially equal to the frame period. As many aircraft approach lighting systems use light emitting diodes (LEDs), the processor may configure camera 101 to utilize various image capture techniques to generate video footage in the form of frames of imagery. For instance, the camera 101 may implement high dynamic range (HDR) and/or LED flicker mitigation (LFM) techniques to generate footage of a field of view including flashing approach lights 104. The processor may implement HDR techniques by combining more than one frame of the same field of view into a single frame to create a frame having a higher quality than the original frame. Additionally, as longer exposures allow more light to be captured to improve imaging of, for example, a field of view having limited light, shorter exposures may allow more detail to be preserved in a field of view having sufficient light. Accordingly, the processor may vary exposure time in HDR to provide high quality imaging of bright and dark content in a field of view. When HDR is applied to frames associated with a field of view having LED lighting (light generated by an LED), a flicker effect may result. While the human eye can adapt to an amount of LED flickering, digital imaging may not be as easily adaptable. One approach to adapting for the use of LED lights by flashing approach lights 104 combine HDR and LED flicker mitigation (LFM) uses split-pixel technology where one or more sensor pixels uses a short exposure and a long exposure to create a combined, flicker-free image.

In embodiments, the memory may store a predetermined sensor pixel value and the processor may be configured to receive the predetermined sensor pixel value and change each sensor pixel value above the threshold sensor pixel value to the predetermined sensor pixel value to enhance the current frame. For example, the predetermined sensor pixel value may correspond to a sensor pixel value or a display pixel value input by the pilot using a user interface as preferred or a maximum sensor pixel value, such as a sensor pixel value of "255", if an ADU range of "0" to "255" is utilized to quantify the amount of light received by that sensor pixel. Similarly, the processor may determine and store a predetermined a sensor pixel value based on the sensor pixel values associated with adjacent sensor pixels.

Figure 3:
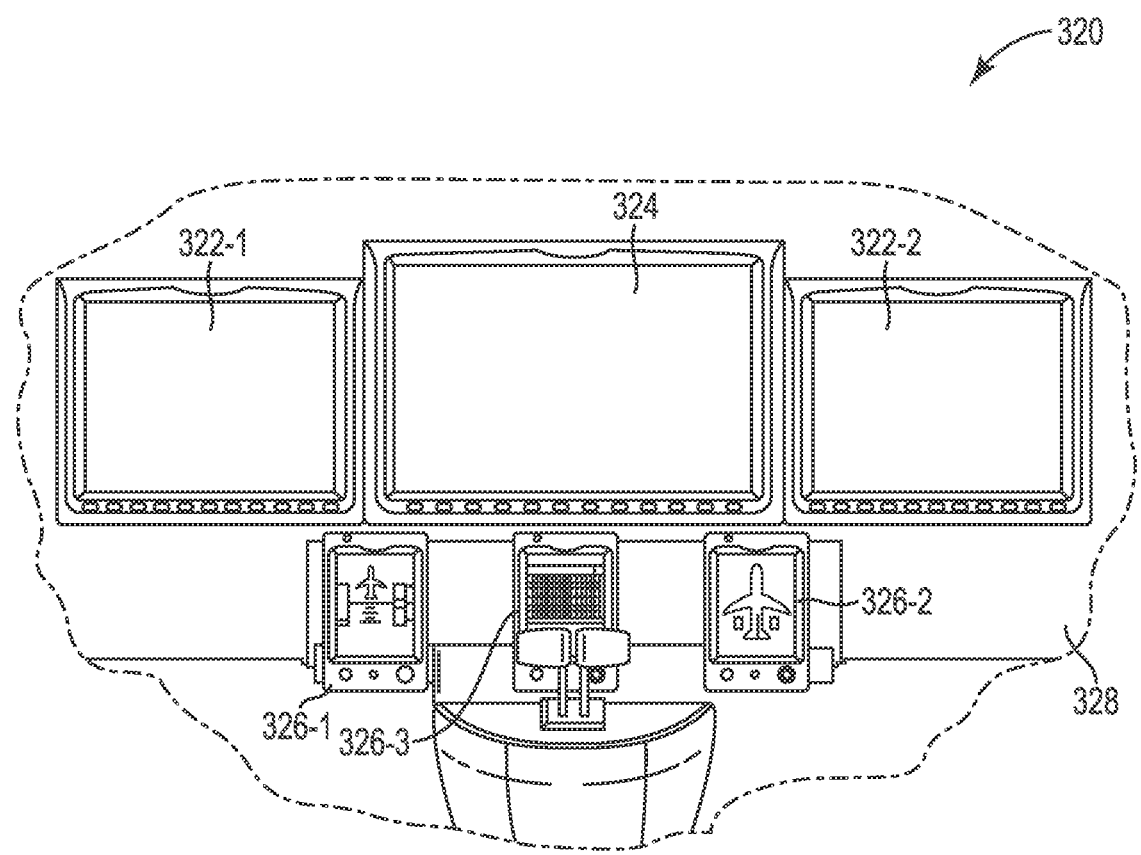
FIG. 3 is an example of an avionics system.

FIG. 3 is an example of an avionics system 320. In some embodiments, the avionics system 320 may be configured as an integrated avionics system. In other configurations, the avionics system 320 may comprise any panel-mount avionics or portable electronics. In implementations, the avionics system 320 may be configured as an electronic flight instrument, a flight display, a navigation device, a communications device, an altimeter, a vertical speed indicator, a horizontal situation indicator, an airspeed indicator, a compass or heading indicator, a tablet, an electronic flight bag, a computing device, a smartphone, a wearable electronic device such as a smartwatch, or any other device suitable for use within an aircraft. FIG. 3 illustrates an example configuration of an integrated avionics system. However, in other embodiments, a user interface can be provided by a tablet, such as an iPad, or an electronic flight bag.

The avionics system 320 may include one or more primary flight displays (PFDs) 322, one or more multifunction displays (MFD) 324, and one or more multi-product avionics control and display units (CDU) 326. For instance, in the implementation illustrated in FIG. 3, the avionics system 320 may be configured for use in an aircraft that is flown by two pilots (e.g., a pilot and a copilot). In this implementation, the avionics system 320 may include a first PFD 322-1, a second PFD 322-2, an MFD 324, a first CDU 326-1, a second CDU 326-2, and a third CDU 326-3 that are mounted in the aircraft's instrument panel 328. Although not specifically illustrated, the avionics system 320 is electrically coupled to camera 101 illustrated in FIG. 1A and receives frames of imagery therefrom as well as a memory that stores frames of imagery output by the camera 101. In embodiments, the avionics system 320 can include a HUD, which may be integrated or mounted in proximity to a windscreen of the aircraft 100 such that a pilot can have at least a portion of a field of view therethrough similar to that of the camera 101 while flying the aircraft 100.

As shown, the MFD 324 can be mounted generally in the center of the instrument panel 328 so that it may be accessed by either pilot (e.g., by either the pilot or the copilot). The first PFD 322-1 and the first CDU 326-1 can be mounted in the instrument panel 328 to the left of the MFD 324 for viewing and access by the pilot. Similarly, the second PFD 322-2 and the second CDU 326-2 can be mounted in the instrument panel 328 to the right of the MFD 324 for viewing and access by the aircraft's copilot or other crew member or passenger. The third CDU 326-3 may be mounted between the first and second CDUs 326-1 and 326-2. In implementations, the CDUs 326 may be positioned within the instrument panel 328 so that they may be readily viewed and/or accessed by the pilot flying the aircraft, which could be either the pilot or copilot.

A PFD 322, MFD 324, and/or CDU 326 can have a plurality of display pixels. In a number of embodiments, a PFD 322, a MFD 324, a CDU 326, and/or a HUD can display enhanced video footage generated by the processor of a field of view. The enhanced video footage includes frames having enhanced frames, where the plurality of sensor pixel values of the enhanced frame correspond to the plurality of display pixels of the PFD 322, the MFD 324, the CDU 326, and/or the HUD. The processor can be incorporated within avionics system 320 or located in a separate enclosure not specifically illustrated in FIG. 3 that is electrically coupled with the PFD 322, the MFD 324, the CDU 326, and/or the HUD of the avionics system 320.

The PFD 322, the MFD 324 and the CDU 326 may comprise an LCD (Liquid Crystal Diode) display, a TFT (Thin Film Transistor) LCD display, an LEP (Light Emitting Polymer) or PLED (Polymer LED) display, a cathode ray tube (CRT), and so forth, capable of displaying the enhanced video footage generated by the processor as well as text and/or graphical information, such as a graphical user interface. The PFD 322, the MFD 324 and the CDU 326 may be backlit via a backlight such that it may be viewed in the dark or other low-light environments. The PFD 322, the MFD 324 and the CDU 326 each have a plurality of display pixels and, in embodiments, the PFD 322, the MFD 324 or the CDU 326 can present enhanced video footage of a field of view including enhanced frames, where the plurality of display pixels of the PFD 322, the MFD 324 and the CDU 326 correspond to the sensor pixel values used by the processor to generate the enhanced video.

Figure 4:
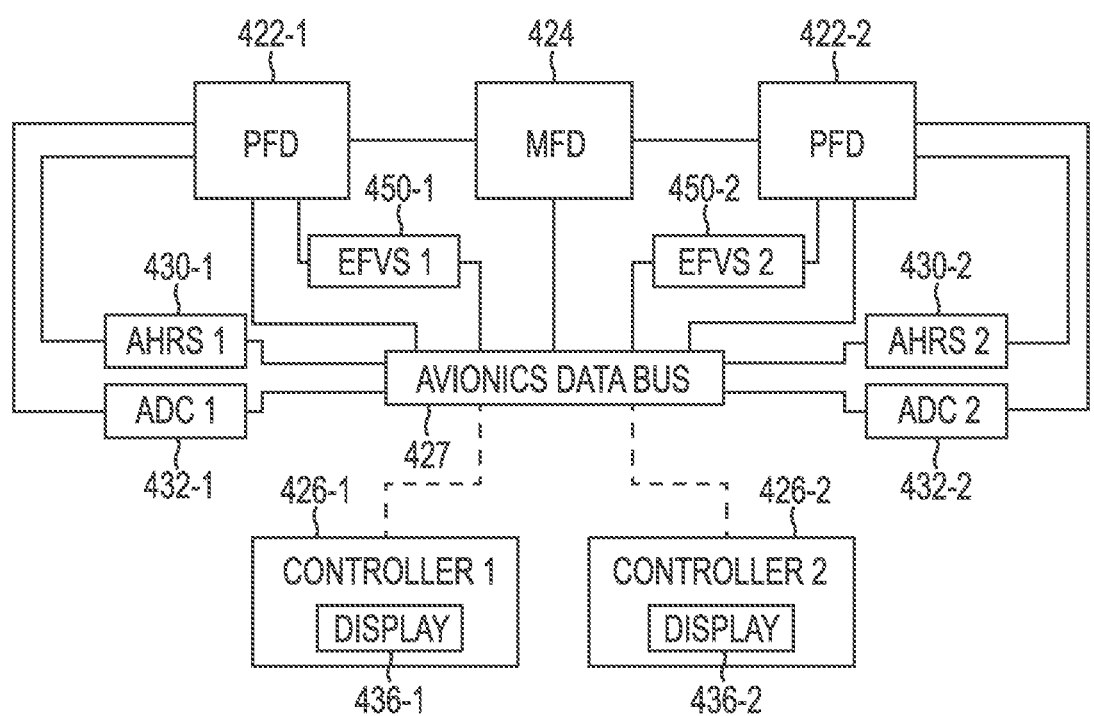
FIG. 4 is a block diagram illustrating components of an avionics system.

FIG. 4 is a block diagram illustrating components of the avionics system 320 of FIG. 3. The PFDs 422-1 and 422-2 may be configured to display primary flight information, such as aircraft attitude, altitude, heading, vertical speed, and so forth. In a number of embodiments, the PFDs 422 may display primary flight information via a graphical representation of basic flight instruments such as an attitude indicator, an airspeed indicator, an altimeter, a heading indicator, a course deviation indicator, and so forth. The PFDs 422 may also display other information providing situational awareness to the pilot such as video footage of a field of view including runway 102, steady burning approach lights 106, and flashing approach lights 104 of an aircraft approach lighting system, moving objects, terrain information, ground proximity warning information, and other objects located between the aircraft 100 and the airport.

The other information providing situational awareness to the pilot can be generated by one or more enhanced flight vision systems 450-1 and 450-2. The enhanced flight vision system 450 can include or be coupled to sensors including a camera 101 to capture footage of the field of view including the flashing approach lights 104 of the aircraft approach lighting system. In embodiments, the processor described herein may be formed in whole or in part by the enhanced flight vision system 450-1, the enhanced flight vision system 450-2, the PFDs 422-1 and 422-2, the MFD 424, a central processor unit for the avionics system, or any combination thereof.

The primary flight information may be generated by one or more flight sensor data sources including, for example, one or more attitude, heading, angular rate, and/or acceleration information sources such as attitude and heading reference systems (AHRS) 430-1 and 430-2, one or more air data information sources such as air data computers (ADCs) 432-1 and 432-2, and/or one or more angle of attack information sources. For instance, the AHRSs 430 may be configured to provide information such as attitude, rate of turn, slip and skid; while the ADCs 432 may be configured to provide information including airspeed, altitude, vertical speed, and outside air temperature. In some embodiments, the functionality of an AHRS 430 and an ADC 432 may be provided by a combined air data, attitude, and heading reference system (ADAHRS). Other configurations are possible.

Integrated avionics units (IAUs) may aggregate the primary flight information from the AHRS 430 and ADC 432 and/or the other information providing situational awareness to the pilot from the enhanced flight vision system 450 and, in some example configurations, provide the information to the PFDs 422 via an avionics data bus 427. In other examples, the various IAUs may directly communicate with either other and other system components. The IAUs may also function as a combined communications and navigation radio. For example, the IAUs may include a two-way VHF communications transceiver, a VHF navigation receiver with glide slope, a global positioning system (GPS) receiver, and so forth. As shown, each integrated avionics unit may be paired with a primary flight display, which may function as a controlling unit for the integrated avionic unit.

In a number of embodiments, the avionics data bus 427 may comprise a high speed data bus (HSDB), such as data bus complying with ARINC 429 data bus standard promulgated by the Airlines Electronic Engineering Committee (AEEC), a MIL-STD-1553 compliant data bus, and so forth. A radar altimeter may be associated with one or more of the IAUs, such as via avionics data bus 427 or a direct connection, to provide precise elevation information (e.g., height above ground) for Autoland functionality. For example, in some configurations, the avionics system includes a radar altimeter to assist an autoland module in various functions of the landing sequence, such as timing and maintaining the level-off and/or flare.

The MFD 424 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 427. The CDUs 426-1 and 426-2 may furnish a general purpose pilot interface to control the aircraft's avionics. For example, the CDUs 426 allow the pilots to control various systems of the aircraft such as the aircraft's autopilot system, flight director (FD), electronic stability and protection (ESP) system, autothrottle, navigation systems, communication systems, engines, and so on, via the avionics data bus 427. In some examples, the CDUs 426 may also be used for control of the integrated avionics system including operation of the PFDs 422 and MFD 424. The PFD 422 can include a processor, a memory, one or more avionics data bus interfaces, and/or displays 436-1 and 436-2. The avionics system comprising PFD 422 may be part of a system or be configured as a standalone avionics device.

An avionics data bus interface, not illustrated, can furnish functionality to enable PFDs 422 to communicate with one or more avionics data buses such as the avionics data bus 427. In various implementations, the avionics data bus interface may include a variety of components, such as processors, memory, encoders, decoders, and so forth, and any associated software employed by these components (e.g., drivers, configuration software, etc.).

The displays 436-1 and 436-2 can show information to the pilot of the aircraft. Similar to the PFD 322, the MFD 324 and the CDU 326, the displays 436-1 and 436-2 may comprise an LCD (Liquid Crystal Diode) display, a TFT (Thin Film Transistor) LCD display, an LEP (Light Emitting Polymer) or PLED (Polymer LED) display, a cathode ray tube (CRT), and so forth, capable of displaying the enhanced video footage generated by the processor as well as text and/or graphical information, such as a graphical user interface. The display 436 may be backlit via a backlight such that it may be viewed in the dark or other low-light environments. The displays 436-1 and 436-2 each have a plurality of display pixels and, in embodiments, the displays 436-1 and 436-2 can present enhanced video footage of a field of view including enhanced frames, where the plurality of display pixels of the displays 436-1 and 436-2 correspond to the sensor pixel values used by the processor to generate the enhanced video. The displays 436-1 and 436-2 may include a touch interface, such as a touch screen, that can detect a touch input within a specified area of each display 436 for entry of information and commands. In a number of embodiments, the touch screen may employ a variety of technologies for detecting touch inputs. For example, the touch screen may employ infrared optical imaging technologies, resistive technologies, capacitive technologies, surface acoustic wave technologies, and so forth. In implementations, buttons, softkeys, keypads, knobs and so forth, may be used for entry of data and commands instead of or in addition to the touch screen. In embodiments, a HUD, which may be integrated or mounted in proximity to a windscreen of the aircraft such that a pilot can have at least a portion of a field of view therethrough similar to that of the camera while flying the aircraft.

Figure 5:
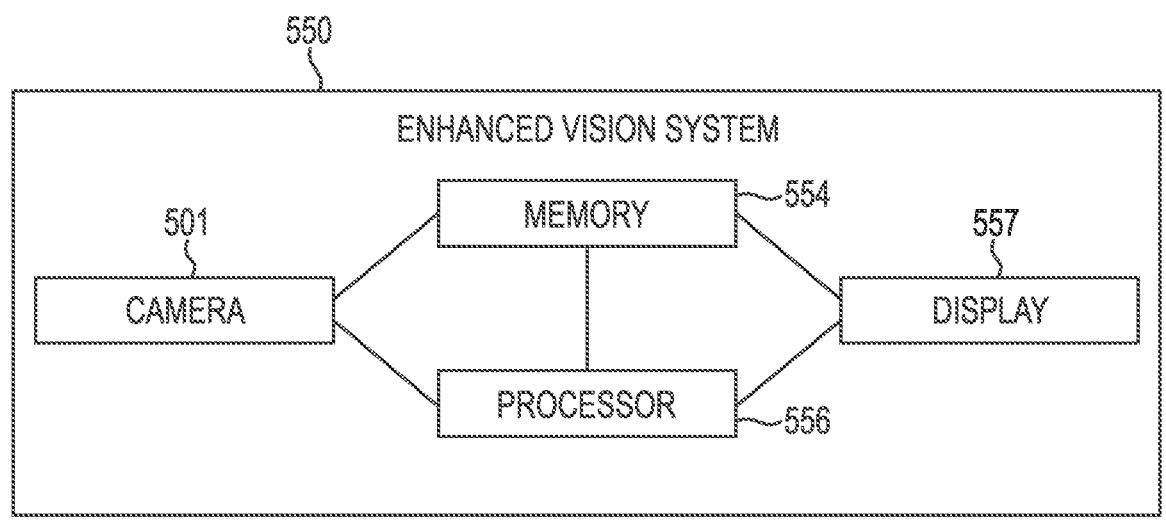
FIG. 5 is a block diagram illustrating components of an enhanced vision system.

FIG. 5 is a block diagram illustrating components of an enhanced vision system 550. The enhanced vision system 550 can include or be coupled to a camera 501, a display 502, a memory 554, and a processor 556.

The camera 501, similar to camera 101 described above, can be coupled to an aircraft 100, as illustrated in FIGS. 1A and 1B, and may incorporate a CMOS sensor. In some configurations, the camera 501 can have a frame rate that is greater than a refresh rate of the display 502 electrically coupled to processor 556. The display 502 presents video footage generated by the camera 501 with an orientation to enable the camera 101 to capture video footage of a field of view of a field of view and output frames of imagery while the aircraft is traveling at high speeds and possibly subject to varying levels of turbulence, which can make the accurate presentation of such steady burning approach lights 106, the flashing approach lights 104 or moving objects, difficult while the distance between the aircraft 100 and the runway 102 is large as such objects may be quite small on the display 502. In embodiments, the camera 501 can include a plurality of sensor pixels and can capture the video footage of the field of view and output a plurality of frames, each frame including a respective sensor pixel value for each of the plurality of sensor pixels.

Display 502, similar to the HUD, the PFD 322, the MFD 324, the CDU 326 and displays 436-1, 436-2 may comprise an LCD (Liquid Crystal Diode) display, a TFT (Thin Film Transistor) LCD display, an LEP (Light Emitting Polymer) or PLED (Polymer LED) display, a cathode ray tube (CRT), and so forth, capable of displaying the enhanced video footage generated by the processor as well as text and/or graphical information, such as a graphical user interface. Display 502 may be backlit via a backlight such that it may be viewed in the dark or other low-light environments. Display 502 has a plurality of display pixels and, in embodiments, the display 502 can present enhanced video footage of a field of view including enhanced frames, where the plurality of display pixels of display 502 correspond to the sensor pixel values used by the processor 556 to generate the enhanced video.

The processor 556 provides processing functionality for the enhanced vision system 550 and can include any number of processors, micro-controllers, circuitry, field programmable gate array (FPGA) or other processing systems, and resident or external memory for storing data, executable code, and other information. The processor 556 may be a graphics processor unit (GPU) or a central processing unit (CPU) generating video content to be presented on display 502. The processor 556 can execute one or more software programs embodied in a non-transitory computer readable medium (e.g., memory 554) that implement techniques described herein, including receiving the plurality of frames output by the camera, identifying in each of the plurality of frames one or more sensor pixel values above a threshold sensor pixel value, enhancing a current frame by changing corresponding pixel values of the current frame based on each of the identified one or more sensor pixel values above the threshold pixel value, and generating an enhanced video of the field of view including the enhanced current frame to be presented on display 502. The processor 556 is not limited by the materials from which it is formed or the processing mechanisms employed therein and, as such, can be implemented via semiconductor(s) and/or transistors (e.g., using electronic integrated circuit (IC) components), and so forth.

The memory 554 can be a tangible, computer-readable storage medium that provides storage functionality to store various data and/or program code associated with an operation, such as software programs and/or code segments, or other data to instruct the processor 556, and possibly other components of the enhanced vision system 550, to perform the functionality described herein. In embodiments, the memory 554 can store a frame rate of the camera 501, a refresh rate of display 502, the plurality of frames output by the camera 501 (including a current frame), an enhanced current frame, the sensor pixel values of each frame, the threshold sensor pixel value, the highest sensor pixel value of each sensor pixel of each frame within a period of time and the average sensor pixel value of each sensor pixel of each frame within a period of time. The memory 554 can also store data, such as program instructions for operating the enhanced vision system 550 including its components, cartographic data associated with airports and associated runways, determined weather conditions and so forth.

It should be noted that while a single memory 554 is described, a wide variety of types and combinations of memory (e.g., tangible, non-transitory memory) can be employed. The memory 554 can be integral with the processor 556, can comprise stand-alone memory, or can be a combination of both. Some examples of the memory 554 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the enhanced vision system 550 and/or the memory 554 can include removable integrated circuit card (ICC) memory, such as memory provided by a subscriber identity module (SIM) card, a universal subscriber identity module (USIM) card, a universal integrated circuit card (UICC), and so on.

Figure 6:
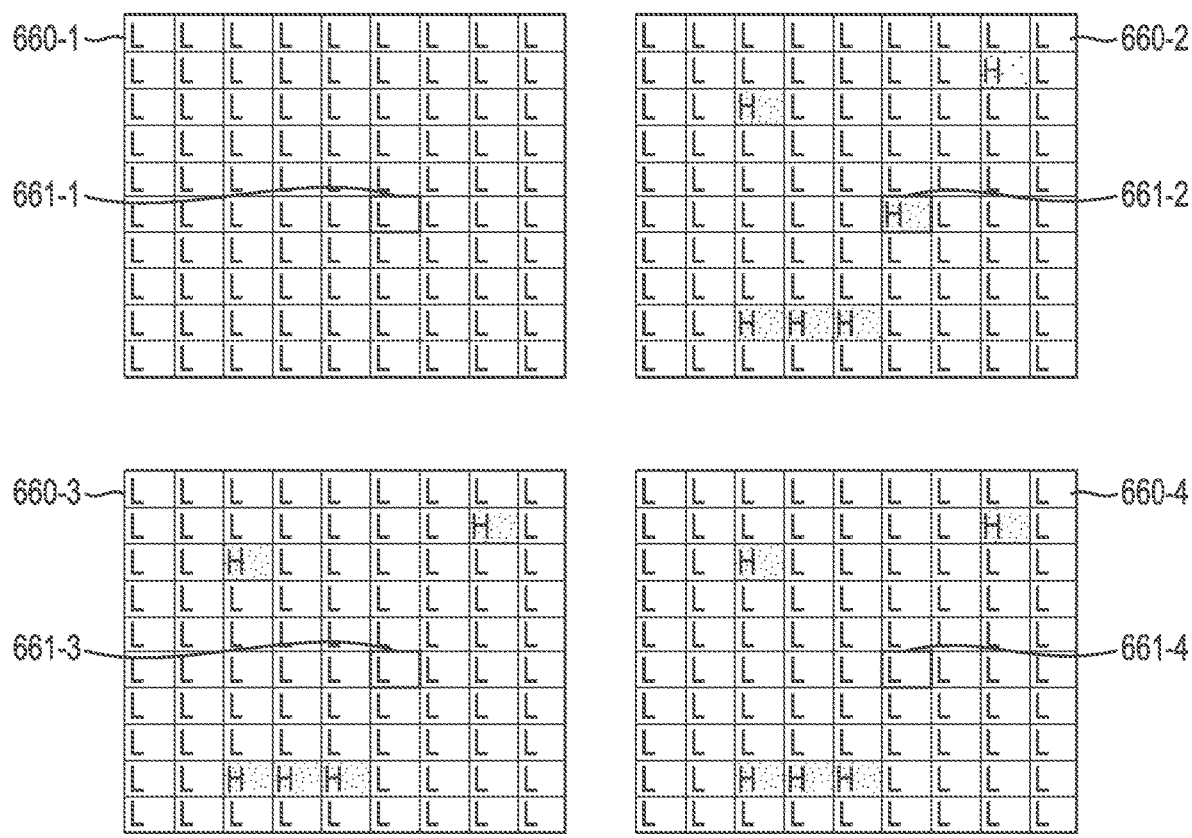
FIG. 6 is an example of frames generated and used by an enhanced vision system to enhance video footage.

FIG. 6 is an example of frames 660-1, 660-2, 660-3, and 660-4 used by an enhanced vision system. It is to be understood that the exemplary frames are simplified to correspond to a camera having 100 elements (arranged in a 10×10 layout) for illustrative purposes, whereas a camera of an enhanced vision system in practice would have millions of elements arranged in a square or rectangular layout in order to capture video footage of a field of view of interest to a pilot. Video footage generated by a camera, such as camera 101, can be output as a sequence of image frames 660 each having a two-dimensional (2D) data sets. In this example, frame 660-1 is the oldest frame and frame 660-4 is the newest (and current) frame output by the camera.

Although only four frames 660-1 to 660-4 are shown in this example of FIG. 6, any number of frames can be generated, analyzed and modified. For example, use of a camera, such as camera 501, generating frames at a rate of 180 frames per second with a display, such as display 502, refreshing the display content with 30 times per second would result in a 6:1 ratio, would result in only one of six frames captured by the camera to be presented on the display as the camera is generating six times as many frames as the display is able to present within each second. Accordingly, in embodiments, a processor, such as processor 556, of the enhanced vision system can select one of the six sequential frames received from the camera to be sent to the display to be presented to the pilots. Alternatively, the processor of the enhanced vision system can generate a frame to be sent to the display to be presented to the pilots that is formed of sensor pixel content in one or more of the six sequential frames received from the camera or the processor can enhance one of the frames, such as the current (most recent frame of each set of six sequential frames received from the camera each second) frame, based on the sensor pixel content in one or more of the six sequential frames received from the camera (if the current frame is enhanced, pixel content in one or more of the five sequential frames before the current frame may be used to enhance the current frame). For example, if the processor will utilize frames 660-1 to 660-4 to output a frame to the display, the processor may be configured to enhance frame 660-4 by applying a highest or an average value of one or more sensor pixel values from one or more of the preceding frames 660-1, 660-2, and 660-3. In some embodiments, the processor may enhance the current frame 660-4 by changing all corresponding sensor pixel values of the current frame 660-4 based on the highest or the average value of each sensor pixel values from 660-1, 660-2 or 660-3. In other embodiments, the processor may enhance the current frame 660-4 by changing the corresponding sensor pixel values of the current frame 660-4 based on the highest or the average value of each sensor pixel values from 660-1, 660-2 or 660-3 for only one or more sensor pixel values that satisfy certain criteria, such as a sensor pixel value that is determined to have exceeded a stored threshold sensor pixel value in preceding frames 660-1, 660-2 or 660-3.

The frames 660 output by the camera include a number of sensor pixel values, where each sensor pixel value corresponds to the intensity of light received by a particular element of the camera, which may be a CMOS sensor or incorporate a CMOS sensor. For example, sensor pixel values corresponding to a sensor pixel that receives light at fluctuating levels over four subsequent frames 660 are identified as sensor pixel value 661-1 in frame 660-1, sensor pixel value 661-2 in frame 660-2, sensor pixel value 661-3 in frame 660-3 and sensor pixel value 661-4 in frame 660-4.

As each sensor pixel of the camera may implement analog-to-digital unit (ADU) conversion techniques to output sensor pixel values using an 8-bit value can have a sensor pixel value between "0" and "255," where "0" corresponds to no light received by that sensor pixel and "255" corresponds to light saturating (completely filling) the sensor pixel, the processor may be configured to categorize the sensor pixel value associated with each sensor pixel as "high" if it is likely to be associated with light emitted from a steady burning approach light 106 or a flashing approach light 104 or as "low" if it is unlikely to be associated with light emitted from a steady burning approach light 106 or a flashing approach light 104 based on a stored threshold sensor pixel value. For example, in embodiments, the processor may be configured to compare each sensor pixel value of each frame to a stored threshold sensor pixel value to determine whether the sensor pixel value is in a "high" state or a "low" state.

As shown in FIG. 6, the processor may identify, in each of the four frames sequentially output by the camera over a period of time, one or more sensor pixel values that are determined to be above the stored threshold sensor pixel value. In this example, for the sensor pixel that received light at fluctuating levels over four subsequent frames 660 having sensor pixel values identified as sensor pixel value 661-1 to 661-4, the processor can identify sensor pixel value 661-2 as being in a high state because it was at or above the stored threshold sensor pixel value, while the corresponding sensor pixel values 661-1, 661-3, and 661-4 can be determined to be in a low state because they are below the threshold sensor pixel value. As used herein, "corresponding sensor pixel values" indicates sensor pixel values for different frames that correspond to a same sensor pixel of the camera and are therefore in an analogous position in the 2D data set. Sensor pixel values determined by the processor to be in a high state are identified with an "H" in FIG. 6. Sensor pixel values determined by the processor to be in a low state are identified with an "L" in FIG. 6.

In a number of embodiments, the threshold sensor pixel value for distinguishing between sensor pixel values determined to be in the high state and the low state can be dynamic as the threshold sensor pixel value can be selected by the processor from a set of threshold sensor pixel values stored in the memory. For instance, the threshold sensor pixel value may be selected by the processor based on environmental considerations, such as time of day, weather conditions or a combination thereof, proximate to the aircraft or to a landing location for aircraft at the airport. For example, the processor can select a higher stored threshold sensor pixel value or dynamically increase the stored threshold sensor pixel value during the day, in clear weather conditions or based on a user input received from the pilot via a user interface of the enhanced vision system. Similarly, the processor can select a lower stored threshold sensor pixel value or dynamically reduce the stored at night, in weather conditions associated with limited visibility, such as dense fog, clouds, rain, or snow, or based on a user input received from the pilot via a user interface of the enhanced vision system.

In embodiments, the processor may form segments (groups) of the sensor pixels of camera 101 and determine the intensity of light received by each segment to determine the threshold sensor pixel value. The processor may utilize the determinations made over an extended period of time to determine whether a change to the threshold sensor pixel value would improve the video enhancement based on the most recent determinations of the intensity of light received by each segment (group) of sensor pixels. For example, the processor may form one hundred segments (groups) of sensor pixels in a grid-like pattern and determine an average as well as a standard deviation of light intensity received by each segment (group) of sensor pixels to determine the threshold sensor pixel value for current environmental conditions, such as high or low ambient light levels.

In embodiments, the processor may be configured to analyze each sensor pixel value associated with each sensor pixel of the camera to identify patterns across frames, such as sequences and light levels that may be indicative of flashing approach lights 104 or steady burning approach lights 106. For example, for the sensor pixel that received light at fluctuating levels over four subsequent frames 660 having sensor pixel values identified as sensor pixel value 661-1 to 661-4, the processor can identify sensor pixel values 661-1, 661-2, and 661-3 changing from the low state to the high state and then back to the low state as a low-high-low pattern (sequence), which can be indicative of a flashing approach light 104. To reduce the possibility of missing a flashing approach light 104, the processor may be configured to enhance the current frame 660-4 by changing the sensor pixel value associated with 661-4 to the highest sensor pixel value of the corresponding sensor pixel values 661-1 through 661-3 for the sensor pixel that received light at fluctuating levels over four subsequent frames 660. Accordingly, the processor configured to output an enhanced current frame to a display would result in a display pixel corresponding to the highest sensor pixel value for the sensor pixel over four subsequent frames 660, which may be associated with early detection of a flashing approach light 104.

In some embodiments, the enhanced vision system includes a camera having a high speed (high frame rate) and capable of generating frames at a sufficient frame rate such that the frame period is as close to a flash pulse duration as possible or exceeds the flash pulse duration. This results in the camera 101 capturing a high 'instantaneous intensity' of the flashing approach light, as opposed to a relatively low 'intensity' associated with steady burning approach lights 106, thereby allowing for earlier detection of flashers relative to other features (visual advantage). Conventional vision systems typically only include an enhanced view of the steady burning approach lights 106 and situational awareness of the surrounding terrain. The processor may set the exposure time of the camera to match the frame period duration. This may help ensure that the camera receives and records objects in its field of view with a 100% duty cycle.

In embodiments, the processor may utilize optical attenuation, such as lens aperture and/or partially transmissive filters, to control exposure of the sensor pixels. The processor may apply optical attenuation in addition to or in lieu of the exposure time. The lens aperture may be controlled via a feedback loop to continuously provide fine control over the desired exposure of the camera's field of view.

In embodiments, the enhanced vision system includes one or more partially transmissive filters, such as ND neutral density filters, polarizers and electrochromic filter. The one or more partially transmissive filters may be mechanically or electrically moved to attenuate the signal. The processor may also provide coarse control over the exposure level and allowing the lens aperture to reset to a low lens aperture F #in bright conditions. The one or more partially transmissive filters may offer fine control with the lens aperture either being fixed, providing some coarse control or a balance of both providing fine and coarse control, or other similar perturbations.

FIGS. 7A and 7B are each examples of an enhanced vision system combining, merging or overlaying a mask with the most recent frame to generate an enhanced frame. Frame 760-4 and sensor pixel value 761-4 can correspond to frame 660-4 and sensor pixel value 661-4 in FIG. 6, respectively. A processor, similar to processor 556, may be configured to enhance frame 760-4 by applying a highest or an average sensor pixel value for one or more sensor pixels over four subsequent frames from one or more of the preceding frames via weight 763. The processor can apply a mask 762 to a current frame 760-4 to enhance the current frame 760-4. In a number of embodiments, the mask 762 can be a pass-through function whereby certain sensor pixel values retain their original values and other sensor pixel values are ensured to have a higher sensor pixel value, or state, between two or more frames. The mask 762 can include weight 763 to apply to one or more of the sensor pixel values of the frame 760-4. Alternatively, in some embodiments, the processor may change the sensor pixel values to a predetermined sensor pixel value stored in memory. For example, the predetermined sensor pixel value may correspond to a sensor pixel value or a display pixel value input by the pilot using a user interface as preferred or a maximum sensor pixel value, such as a sensor pixel value of "255", if an ADU range of "0" to "255" is utilized to quantify the amount of light received by that sensor pixel. In embodiments, the processor may determine a sensor pixel value based on the sensor pixel values associated with adjacent sensor pixels.

As shown in FIG. 7A, the mask 762 can be applied to the current frame 760-4 to generate an enhanced frame 764. The weight 763 can be a value that replaces the sensor pixel value 761-4 of the current frame 760-4 to yield the sensor pixel value 765, which is in a high state, in the enhanced frame 764.

As shown in FIG. 7B, which includes a numeric (8-bit) sensor pixel value between "0" and "255" (where "0" corresponds to no light received by that sensor pixel and "255" corresponds to light saturating (completely filling) the sensor pixel) of each sensor pixel value within each frame generated and output by the camera, the processor may be configured to apply mask 762 to the current frame 760-4 to generate an enhanced frame 764. The weight 763 can be a sensor pixel value of "175" that replaces the sensor pixel value "33" indicated at 761-4, which is represented by the sensor pixel value "175" indicated at 765.

An enhanced frame 764 can be the result of applying a mask 762 to a current frame 760-4. The enhanced frame 764 can include the weighted sensor pixel value 765 and the rest of the sensor pixel values from frame 760-4 can remain unchanged after application of the mask.

FIGS. 8A-8O are each examples of a processor configured to changing or preserving a sensor pixel value associated with a sensor pixel in a current frame based on sensor pixel values associated with the same sensor pixel in a plurality of preceding frames when enhancing the current frame. FIGS. 8A-8O each include a plurality of frames output by a camera, similar to camera 501, over a first period of time ("Frame 1", "Frame 2", "Frame 3", "Frame 4", "Frame 5" and "Frame 6," which is the current (most recent) frame of the sequential set of frames), a corresponding sensor pixel value associated with a sensor pixel for each frame (the numerical values), an indication of whether the corresponding sensor pixel value is determined to be in a high or low state (e.g., "High" or "Low"), and an sensor pixel value associated with the same sensor pixel in the enhanced frame ("Output") with a corresponding sensor pixel value (the bold numerical value).

The first period of time may correspond to a time period over which the processor receives a plurality of sequential frames from the camera before one enhanced frame is output by the processor to the display (for each refresh of the display) and a second period of time may correspond to a time period between flashes of light from a flashing approach light near a runway. For instance, use of a camera generating frames at a rate of 180 frames per second with a display refreshing the display content with 30 times per second, which results in a 6:1 ratio of camera frames to frames presented on the display, the first period of time may be approximately 33 milliseconds. If the second time period corresponding to the duration of time between flashes of light is between 250 microseconds and 5.5 milliseconds, the processor may identify a plurality of instances where a flashing approach light will have flashed on and off during first duration of time that can be enhanced in the current frame to be output to the display for presentation to the user.

In FIGS. 8A, 8B, 8C, 8D, and 8E, the processor enhances a current frame (Frame 6) such that it is set to a sensor pixel value equal to a highest sensor pixel value identified across all six frames within the first period of time. The processor of the enhanced vision system may be configured to identify the highest sensor pixel value, which is "125" in frame 2 of FIG. 8A, "145" in frame 2 of FIG. 8B, "201" in frame 4 of FIG. 8C, "141" in frame 4 of FIG. 8D, and "135" in frames 3 and 4 in FIG. 8E, and enhance the current frame by changing the sensor pixel value of the current frame (Frame 6) to those highest values in each example. The processor of the enhanced vision system can output an enhanced frame having that highest value as the corresponding sensor pixel value corresponding to a single a sensor pixel to the pixel to present enhanced video footage on the display at each refresh of the display.

In FIG. 8F, the processor has not identified any sensor pixel values associated with a sensor pixel of the camera in the sequential frames that may have received light emitted by a flashing approach light because none of the sensor pixel values are determined to have exceeded a stored threshold sensor pixel value within the first period of time. Accordingly, the sensor pixel is determined to remain in a low state for all six sequential frames in the first period of time. Accordingly, any sensor pixel value of the pixel of the six frames can be used. In a number of embodiments, the sensor pixel value for the sensor pixel in the current (most recent) frame 6 of "120" is retained in the current frame is output by the processor to the display of the enhanced vision system. In other words, this sensor pixel value of a sensor pixel in the current Frame 6 may not be changed. It is to be understood that the processor may nonetheless enhance the current Frame 6 by changing a plurality of other sensor pixel values that are determined to exceed a stored threshold sensor pixel value within the first period of time.

In FIG. 8G, the processor has determined that sensor pixel values associated with a sensor pixel of the camera in Frame 1, Frame 4 and Frame 6 may have received light emitted by a flashing approach light because those sensor pixel values are determined to have exceeded a stored threshold sensor pixel value within the first period of time. Accordingly, the processor may determine that the sensor pixel of the camera associated with this example is in a high state in Frame 1, Frame 4 and Frame 6 in the first period of time. For embodiments in which the processor is configured to enhance the current Frame 6 by changing the sensor pixel values of the current frame, the processor will replace the current sensor pixel value of "85" in the current Frame 6 with an average sensor pixel value determined for all of the sensor pixel values determined to have exceeded the stored threshold sensor pixel value ("137" is an average of "125," "201" and "85"). Alternatively, for embodiments in which the processor is configured to enhance the video footage by generating a new frame based on the sensor pixel values of each sensor pixel in the sequential frames analyzed by the processor, the processor will utilize the average sensor pixel value of "137" determined for all of the sensor pixel values determined to have exceeded the stored threshold sensor pixel value ("125," "201" and "85") for this sensor pixel in the enhanced frame output to the display.

Similarly, in FIG. 8H, the processor has determined that sensor pixel values associated with a sensor pixel of the camera in Frame 1 and Frame 4 may have received light emitted by a flashing approach light because those sensor pixel values are determined to have exceeded a stored threshold sensor pixel value within the first period of time. Accordingly, the processor may determine that the sensor pixel of the camera associated with this example is in a high state in Frame 1 and Frame 4 in the first period of time. For embodiments in which the processor is configured to enhance the current Frame 6 by changing the sensor pixel values of the current frame, the processor will replace the current sensor pixel value of "22" in the current Frame 6 with an average sensor pixel value determined for all of the sensor pixel values determined to have exceeded the stored threshold sensor pixel value ("163" is an average of "125" and "201"). Alternatively, for embodiments in which the processor is configured to enhance the video footage by generating a new frame based on the sensor pixel values of each sensor pixel in the sequential frames analyzed by the processor, the processor will utilize the average sensor pixel value of "163" determined for all of the sensor pixel values determined to have exceeded the stored threshold sensor pixel value ("125" and "201") for this sensor pixel in the enhanced frame output to the display.

In embodiments, the processor may be configured to identify transitions of the sensor pixel values associated with the sensor pixel of the camera between the high state and the low state within the first period of time. In FIG. 8I, the processor has determined that the sensor pixel value associated with a sensor pixel of the camera in Frame 3 may have received light emitted by a flashing approach light because that sensor pixel value is determined to have exceeded a stored threshold sensor pixel value within the first period of time. Accordingly, the five other sensor pixel values associated with the sensor pixel of the camera in the sequential frames are not identified by the processor as possibly having received light emitted by a flashing approach light because those five sensor pixel values are not determined to have exceeded the stored threshold sensor pixel value within the first period of time. In embodiments, the processor may be configured to identify a transition of the sensor pixel values associated with the sensor pixel of the camera from a low state, to a high state and then back to a low state within three sequential frames as part of a low-high-low pattern as an event resulting in the sensor pixel value for the high state being utilized for the sensor pixel value for the sensor pixel in the frame output by the processor to the display. In the example shown in FIG. 8I, the processor identifies the low-high-low pattern in Frame 2 through Frame 4 with a sensor pixel value for the sensor pixel of "175" in Frame 3. For embodiments in which the processor is configured to enhance the current Frame 6 by changing the sensor pixel values of the current frame, the processor will replace the current sensor pixel value of "20" in the current Frame 6 with the sensor pixel value for the high state from the low-high-low pattern. Alternatively, for embodiments in which the processor is configured to enhance the video footage by generating a new frame based on the sensor pixel values of each sensor pixel in the sequential frames analyzed by the processor, the processor will utilize the sensor pixel value for the high state from the low-high-low pattern of "175" for this sensor pixel in the enhanced frame output to the display.

In FIG. 8J, the processor has determined that the sensor pixel values associated with a sensor pixel of the camera in Frame 3 and Frame 4 may have received light emitted by a flashing approach light because those sensor pixel values are determined to have exceeded a stored threshold sensor pixel value within the first period of time and identified a transition of the sensor pixel values associated with the sensor pixel of the camera from a low state, to a high state, remain in a high state and then back to a low state within four sequential frames as part of a low-high-high-low pattern as an event the processor is configured to cause the highest sensor pixel value for the two high states being utilized for the sensor pixel value for the sensor pixel in the frame output by the processor to the display. In the example shown in FIG. 8J, the processor identifies the low-high-high-low pattern in Frame 2 through Frame 5 with a sensor pixel value for the sensor pixel of "175" and "132" in Frame 3 and Frame 4. For embodiments in which the processor is configured to enhance the current Frame 6 by changing the sensor pixel values of the current frame, the processor will replace the current sensor pixel value of "20" in the current Frame 6 with the highest sensor pixel value of "175" for the two high states from the low-high-high-low pattern. Alternatively, for embodiments in which the processor is configured to enhance the video footage by generating a new frame based on the sensor pixel values of each sensor pixel in the sequential frames analyzed by the processor, the processor will utilize the highest sensor pixel value of "175" for the two high states from the low-high-high-low pattern for this sensor pixel in the enhanced frame output to the display.

In embodiments, the processor may be configured to identify a transition of the sensor pixel values associated with the sensor pixel of the camera from a low state, to a high state, remain in a high state and then back to a low state within four sequential frames as part of a low-high-high-low pattern as an event resulting in the average sensor pixel value for the two high states being utilized for the sensor pixel value for the sensor pixel in the frame output by the processor to the display. In the example shown in FIG. 8K, the processor has determined that the sensor pixel value associated with a sensor pixel of the camera in Frame 3 and Frame 4 may have received light emitted by a flashing approach light because those sensor pixel values are determined to have exceeded a stored threshold sensor pixel value within the first period of time and identifies the low-high-high-low pattern in Frame 2 through Frame 5 with a sensor pixel value for the sensor pixel of "176" and "132" in Frame 3 and Frame 4. For embodiments in which the processor is configured to enhance the current Frame 6 by changing the sensor pixel values of the current frame, the processor will replace the current sensor pixel value of "20" in the current Frame 6 with the average sensor pixel value of "154" for the two high states from the low-high-high-low pattern (a value of "154" being an average of "176" and "132"). Alternatively, for embodiments in which the processor is configured to enhance the video footage by generating a new frame based on the sensor pixel values of each sensor pixel in the sequential frames analyzed by the processor, the processor will utilize the average sensor pixel value of "154" for the two high states from the low-high-high-low pattern for this sensor pixel in the enhanced frame output to the display.

In embodiments, the processor may be configured to identify a transition of the sensor pixel values associated with the sensor pixel of the camera from a low state, to a high state, remain in a high state for two frames and then back to a low state within five sequential frames as part of a low-high-high-high-low pattern as an event resulting in the sensor pixel value of current frame being utilized for the sensor pixel value for the sensor pixel in the frame output by the processor to the display. In some situations, the processor identifying the low-high-high-high-low pattern for a pixel sensor in five sequential frames is indicative of a light not originating from a flashing approach light 104 as the light is being received by the sensor pixel of the camera for longer than expected for a flashing approach light 104, which can indicate the light originates from something else, such as light from the sun or other source of light, reflected from a reflective surface or other light source. In the example shown in FIGS. 8L and 8M, a sensor pixel value of the current (most recent) frame ("Frame 6") can be utilized for the sensor pixel value for the sensor pixel in the enhanced frame output by the processor to the display when a low-high-high-high-low pattern is identified by the processor. In some embodiments, the processor of the enhanced vision system may be configured to select a sensor pixel value below the sensor pixel values associated with the three high states to reduce the prominence of this light on the display for the user.

In embodiments, the processor may be configured to identify a transition of the sensor pixel values associated with the sensor pixel of the camera from a low state, to a high state and remain in a high state for four or more sequential frames as part of a low-high-high-high pattern as an event resulting in the sensor pixel value of a sensor pixel in the current (most recent) frame being utilized for the sensor pixel value for the sensor pixel in the frame output by the processor to the display. In some situations, the processor identifying the low-high-high-high pattern for a pixel sensor in four or more sequential frames is indicative of a light not originating from a flashing approach light 104 as the light is being received by the sensor pixel of the camera for longer than expected for a flashing approach light 104, which can indicate the light originates from something else, such as light from the sun or other source of light, reflected from a reflective surface or other light source. For example, as shown in FIG. 8N, a current sensor pixel value of "150" can be utilized for the sensor pixel value for the sensor pixel in the frame output by the processor to the display when a low-high-high-high pattern is identified by the processor in Frame 2 through Frame 6.

In embodiments, the processor may be configured to identify transitions of the sensor pixel values associated with the sensor pixel of the camera between the high state and the low state within the first period of time and a similar duration of time after the completion of the first period of time when the processor identifies an initial portion of a stored pattern of interest. For instance, as shown in FIG. 8O, a processor analyzing each sensor pixel value of sequential frames to identify a low-high-low pattern may continue monitor subsequent frames once a low-high pattern is identified at the end of the first period of time. In such an event, a sensor pixel value of the previous frame (Frame 6) output by the processor to the display when a low-high-low pattern is identified as completed in subsequent frame(s). The processor may identify the low to high transition from Frame 5 to Frame 6 could be the start of a low-high-low pattern that may be associated with flashing approach light 104, however the increase in light received by this sensor pixel could originate from a source other than a flashing approach light 104.

In embodiments, the processor may be configured to identify transitions of the sensor pixel values associated with the sensor pixel of the camera between the high state and the low state within the first period of time and a similar duration of time after the completion of the first period of time. For instance, as shown in FIG. 8O, the processor may identify a low-high-low pattern in Frame 5 and Frame 6 within the first period of time and a remainder of the low-high-low pattern with subsequent Frame 7.

In embodiments, the processor may be configured to utilize a sensor pixel values associated with the sensor pixel of the camera in the last frame output by the processor to the display. For example, the processor may utilize a sensor pixel determined in the first period of time after a subsequent set of frames associated with a duration of time equal to the first period time does not contain sensor pixel values the processor determines to be reliable. As shown in FIG. 8O, the processor may utilize a previous sensor pixel value of "150" determined in the first period of time for the next frame output by the processor to the display based on a determination that the sensor pixel values in Frames 7 through Frame 12 are unreliable.

In embodiments, the processor may enhance a current frame independent of a threshold sensor pixel value. For example, the processor may determine changes of sensor pixel values for each sensor pixel between successive frames received over the first period of time to enhance a current frame. For example, if the processor is evaluating the sensor pixel values associated with a sensor pixel shown in FIG. 8B, the processor may determine that the sensor pixel value increased by 17 brightness levels by increasing from a sensor pixel value of "128" in Frame 1 to a sensor pixel value of "145" of Frame 2, the sensor pixel value decreased by 10 brightness levels by decreasing from a sensor pixel value of "145" in Frame 2 to a sensor pixel value of "135" of Frame 3, the sensor pixel value decreased by 8 brightness levels by increasing from a sensor pixel value of "135" in Frame 3 to a sensor pixel value of "127" of Frame 4, the sensor pixel value increased by 3 brightness levels by increasing from a sensor pixel value of "127" in Frame 4 to a sensor pixel value of "130" of Frame 5 and the sensor pixel value increased by 10 brightness levels by increasing from a sensor pixel value of "130" in Frame 5 to a sensor pixel value of "140" of Frame 6. The processor may utilize these changes of sensor pixel values for each sensor pixel between successive frames over the first period of time to determine a sensor pixel value for the sensor pixel when enhancing the current frame.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

As used herein, "a number of" something can refer to one or more of such things. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An enhanced vision system operable to be used with an aircraft, the enhanced vision system comprising:
   a camera including a plurality of sensor pixels, the camera configured to capture video of a field of view and output a plurality of frames, each frame including a respective sensor pixel value for each of the plurality of sensor pixels;
   a memory configured to store the plurality of frames and a threshold sensor pixel value; and
   a processor coupled to the camera and the memory, the processor configured to:
      receive, from the memory, the plurality of frames output by the camera over a first period of time, the plurality of frames including a current frame;
      identify, in each of the plurality of frames output over the first period of time, one or more sensor pixel values above the threshold sensor pixel value;
      determine a highest sensor pixel value in the plurality of frames output over the first period of time for each sensor pixel value above the threshold sensor pixel value;
      enhance the current frame by changing corresponding sensor pixel values of the current frame based on each of the identified one or more sensor pixel values above the threshold sensor pixel value, the sensor pixel values of the current frame changed to the highest determined sensor pixel value; and
      generate an enhanced video of the field of view including the enhanced current frame to be presented on a display, the display having a plurality of display pixels corresponding to the sensor pixel values.

2. The enhanced vision system of claim 1, wherein the memory is further configured to store a predetermined sensor pixel value, and wherein the processor is further configured to receive the predetermined sensor pixel value and change each sensor pixel value above the threshold sensor pixel value to the predetermined sensor pixel value to enhance the current frame.

3. The enhanced vision system of claim 1, wherein the processor is further configured to:
   designate sensor pixel values determined to be above the threshold sensor pixel value as being in a high state; and
   designate sensor pixel values determined to be below the threshold sensor pixel value as being in a low state.

4. The enhanced vision system of claim 3, wherein the processor is further configured to determine that a particular sensor pixel value changed from the low state to the high state and then back to the low state in three sequential frames, and in response the processor is configured to enhance the current frame by changing the corresponding sensor pixel value to a highest sensor pixel value of the particular sensor pixel value within the three sequential frames.

5. The enhanced vision system of claim 3, wherein the processor is further configured to determine that a particular sensor pixel value changed from the low state to the high state, remained in the high state in the next frame, and then back to the low state in four sequential frames, and in response the processor is configured to enhance the current frame by changing the corresponding sensor pixel value to a highest sensor pixel value of the particular sensor pixel value within the four sequential frames.

6. The enhanced vision system of claim 3, wherein the processor is further configured to determine that a particular sensor pixel value changed from the low state to the high state and then back to the low state during at least a portion of the first period of time.

7. The enhanced vision system of claim 3, wherein the processor is further configured to:
   determine an average sensor pixel value for each of the identified one or more sensor pixel values above the threshold sensor pixel value; and
   change the corresponding sensor pixel values of the current frame to the determined average sensor pixel values for each of the one or more sensor pixel values above the threshold sensor pixel value to enhance the current frame.

8. The enhanced vision system of claim 1, wherein the camera comprises a CMOS sensor, and wherein the camera has a frame rate that is greater than a refresh rate of the display.

9. The enhanced vision system of claim 1, wherein the processor is further configured to determine weather conditions proximate to a landing location for aircraft and adjust the stored threshold sensor pixel value in response to determining weather conditions that limit visibility.

10. The enhanced vision system of claim 1, wherein the processor is further configured to generate a mask associated with sensor pixels of the current frame having sensor pixel values above the threshold sensor pixel value in at least one of the plurality of frames output over the first period of time, and wherein the processor changes each of the sensor pixel values above the threshold sensor pixel value to enhance the current frame by combining the current frame with the mask.

11. The enhanced vision system of claim 1, wherein a portion of the field of view comprises a flashing light of an aircraft approach lighting system proximate to a landing location for aircraft.

12. The enhanced vision system of claim 1, wherein a portion of the field of view comprises a light originating from another aircraft between the aircraft and a landing location for aircraft.

13. An enhanced vision system operable to be used with an aircraft, the enhanced vision system comprising:
   a camera including a plurality of sensor pixels, the camera configured to capture video of a field of view and output a plurality of frames, each frame including a respective sensor pixel value for each of the plurality of sensor pixels;
   a display having a plurality of display pixels corresponding to the sensor pixel values;
   a memory configured to store the plurality of frames, a threshold sensor pixel value and a predefined pattern; and
   a processor coupled to the camera and the memory, the processor configured to:
      receive, from the memory, the plurality of frames output by the camera over a first period of time, the plurality of frames including a current frame;
      identify, in each of the plurality of frames output over the first period of time, one or more sensor pixel values of a plurality of sensor pixel values above the threshold sensor pixel value;
      detect the predefined pattern for a sensor pixel over the first period of time based on the sensor pixel values in a subset of the plurality of frames output by the camera;
      enhance the current frame by changing corresponding sensor pixel values of the current frame to a highest sensor pixel value of the identified one or more sensor pixel values above the threshold sensor pixel value in response to the predefined pattern being detected; and generate, and output to the display, an enhanced video of the field of view including the enhanced current frame to be presented on the display.

14. The enhanced vision system of claim 13, wherein the processor is further configured to detect the predefined pattern in response to a particular sensor pixel value changing from a low state to a high state, remaining in the high state in a next frame, and then going back to the low state in four sequential frames.

15. The enhanced vision system of claim 13, wherein the camera comprises a CMOS sensor, and herein the camera has a frame rate that is greater than a refresh rate of the display.

16. The enhanced vision system of claim 13, wherein a portion of the field of view comprises one of a flashing light of an aircraft approach lighting system proximate to a landing location for aircraft or a light originating from another aircraft between the aircraft and a landing location for aircraft.

17. An enhanced vision system operable to be used with an aircraft, the enhanced vision system comprising:
a camera including a plurality of sensor pixels, the camera configured to capture video of a field of view and output a plurality of frames, each frame including a respective sensor pixel value for each of the plurality of sensor pixels;
a display having a plurality of display pixels corresponding to the sensor pixel values;
a memory configured to store the plurality of frames and a threshold sensor pixel value; and
a processor coupled to the camera, the display and the memory, the processor configured to:
receive, from the memory, the plurality of frames output by the camera over a first period of time, the plurality of frames including a current frame;
identify, in each of the plurality of frames output over the first period of time, one or more sensor pixel values above the threshold sensor pixel value as a high state;
enhance the current frame by changing corresponding sensor pixel values of the current frame to an average of each of the one or more sensor pixel values identified as being in the high state; and
generate, and output to the display, an enhanced video of the field of view including the enhanced frame to be presented on the display;
wherein the processor is further configured to increase the threshold sensor pixel value in response to identifying a high level of ambient light and decrease the threshold sensor pixel value in response to identifying a low level of ambient light or weather conditions that limit visibility.

18. The enhanced vision system of claim 17, wherein the processor is further configured to set the threshold sensor pixel value based on a stored intensity of a flashing light of an aircraft approach lighting system, and wherein a portion of the field of view comprises a flashing light of an aircraft approach lighting system proximate to a landing location for aircraft.

* * * * *